United States Patent
Aloni et al.

(10) Patent No.: US 9,438,535 B2
(45) Date of Patent: *Sep. 6, 2016

(54) METHOD AND SYSTEM FOR A PLURALITY OF PHYSICAL LAYERS FOR NETWORK CONNECTION

(71) Applicant: Broadcom Israel Research, Inc., Ramat Gan (IL)

(72) Inventors: Eliezer Aloni, Zur Yigal (IL); Uri Elzur, Irvine, CA (US); Predrag Kostic, Burnaby (CA); Klaus Friedrich, Lake Forest, CA (US)

(73) Assignee: Broadcom Israel Research, Ltd., Ramat Gan (IL)

(*) Notice: Subject to any disclaimer, the term of this patent is extended or adjusted under 35 U.S.C. 154(b) by 188 days.

This patent is subject to a terminal disclaimer.

(21) Appl. No.: 13/969,815

(22) Filed: Aug. 19, 2013

(65) Prior Publication Data
US 2013/0336145 A1 Dec. 19, 2013

Related U.S. Application Data

(63) Continuation of application No. 11/617,498, filed on Dec. 28, 2006, now Pat. No. 8,514,877.

(60) Provisional application No. 60/759,498, filed on Jan. 17, 2006.

(51) Int. Cl.
*H04L 1/00* (2006.01)
*H04L 12/931* (2013.01)
*H04L 12/24* (2006.01)

(52) U.S. Cl.
CPC ............ *H04L 49/352* (2013.01); *H04L 41/12* (2013.01); *H04L 41/142* (2013.01)

(58) Field of Classification Search
CPC ... H04W 84/12; H04W 84/13; H04W 84/14; H04W 84/15; H04W 84/16; H04Q 11/0471; H04Q 11/0472; H04Q 11/0473; H04L 29/06163; H04L 29/06164; H04L 29/06068; H04L 29/06069
USPC ................ 370/420, 388, 401, 465–467, 546
See application file for complete search history.

(56) References Cited

U.S. PATENT DOCUMENTS

| | | |
|---|---|---|
| 5,687,174 A | 11/1997 | Edem et al. |
| 6,965,787 B2 | 11/2005 | Kindo et al. |
| 7,200,153 B2 | 4/2007 | Feuerstraeter et al. |
| 7,433,971 B2 | 10/2008 | Feuerstraeter et al. |
| 8,514,877 B2 | 8/2013 | Aloni et al. |
| 2002/0165961 A1 | 11/2002 | Everdell et al. |
| 2003/0097480 A1* | 5/2003 | Feuerstraeter et al. ........ 709/251 |
| 2004/0208180 A1 | 10/2004 | Light et al. |
| 2007/0091813 A1 | 4/2007 | Richard et al. |
| 2009/0150504 A1 | 6/2009 | Graham et al. |

* cited by examiner

*Primary Examiner* — Dady Chery
(74) *Attorney, Agent, or Firm* — Oblon, McClelland, Maier & Neustadt, L.L.P.

(57) ABSTRACT

Methods and systems for a plurality of physical layers for network connection may include coupling a MAC to one of a plurality of PHYs. The coupling to a specific PHY may be based on auto-detection of network activity, or network devices, via the PHYs. Also, one of the PHYs may be coupled to the MAC as a power-up default. The PHYs may be coupled to a same network, by, for example, cables. A first cable to a first PHY may couple it to a first network switch and a second cable to a second PHY may couple it to a second network switch. The first network switch may be rated to handle, for example, a greater data rate than the second network switch. The first cable may not be able to be used as a cable for the second PHY, and vice versa.

20 Claims, 13 Drawing Sheets

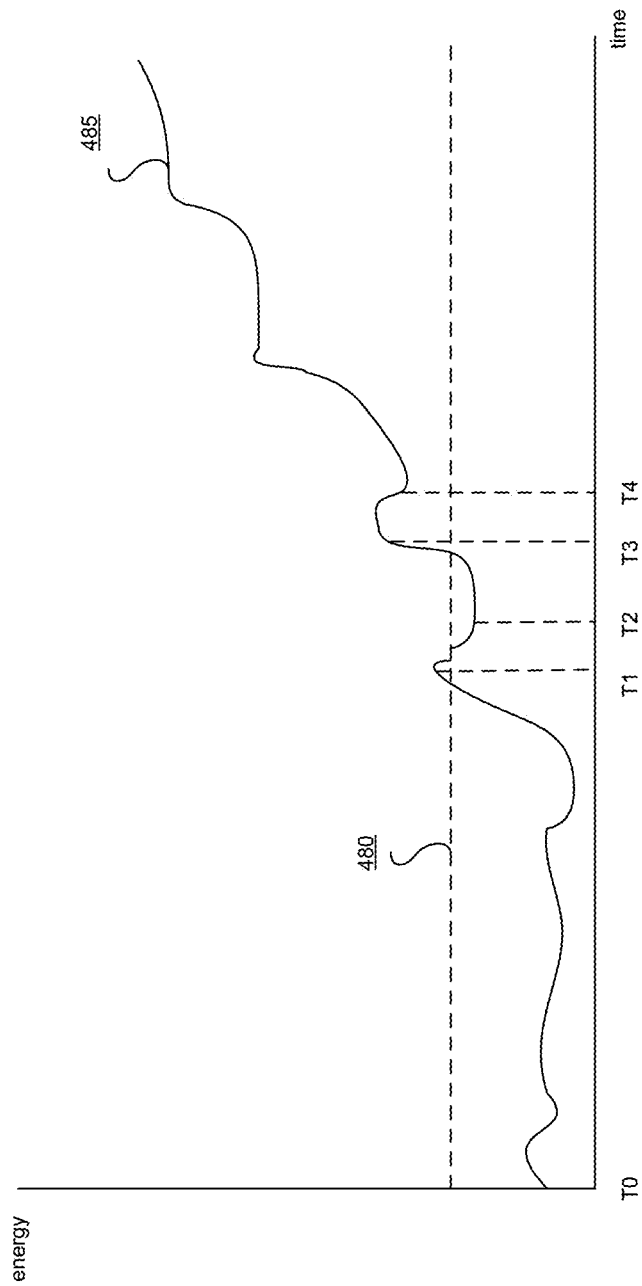

METHOD AND SYSTEM FOR A PLURALITY OF PHYSICAL LAYERS FOR NETWORK CONNECTION

CROSS-REFERENCE TO RELATED APPLICATIONS/INCORPORATION BY REFERENCE

This application is a continuation of U.S. patent application Ser. No. 11/617,498, titled "METHOD AND SYSTEM FOR A PLURALITY OF PHYSICAL LAYERS FOR NETWORK CONNECTION" and filed Dec. 28, 2006, which makes reference to, claims priority to, and claims benefit of U.S. Provisional Application Ser. No. 60/759,498 titled "METHOD AND SYSTEM FOR DUAL SERDES FOR USE IN SERVER APPLICATIONS" and filed Jan. 17, 2006. The above stated applications are hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to network communication. More specifically, certain embodiments of the invention relate to a method and system for a plurality of physical layers for network connection.

BACKGROUND OF THE INVENTION

The International Standards Organization (ISO) has established the Open Systems Interconnection (OSI) Reference Model. The OSI Reference Model provides a network design framework allowing equipment from different vendors to be able to communicate. More specifically, the OSI Reference Model organizes the communication process into seven layers of protocol. Layer 1 is referred to as the physical layer, which is responsible for handling electrical, optical, opto-electrical, and mechanical requirements for interfacing to the communication media. Notably, the physical layer may facilitate the transfer of electrical signals representing an information bit stream. The physical layer may also provide services such as, for example, encoding, decoding, synchronization, clock data recovery, and transmission and reception of bit streams.

As the demand for higher data rates and bandwidth continues to increase, networks may be upgraded by replacing older, slower switches with higher speed switches. For example, Gigabit Ethernet (GbE), which initially found application in gigabit servers, is becoming widespread in personal computers, laptops, and switches, thereby providing the necessary infrastructure for handling data traffic for PCs and servers. Hence, a network may replace a 1 GbE switch with a 10 GbE switch. However, there may be instances when a user's network layer 1 equipment cannot take advantage of a higher speed network switch.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a plurality of physical layers for network connection, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4d is an exemplary graph of network energy detected versus time, in accordance with an embodiment of the invention.

DETAILED DESCRIPTION OF THE INVENTION

Figure 1:
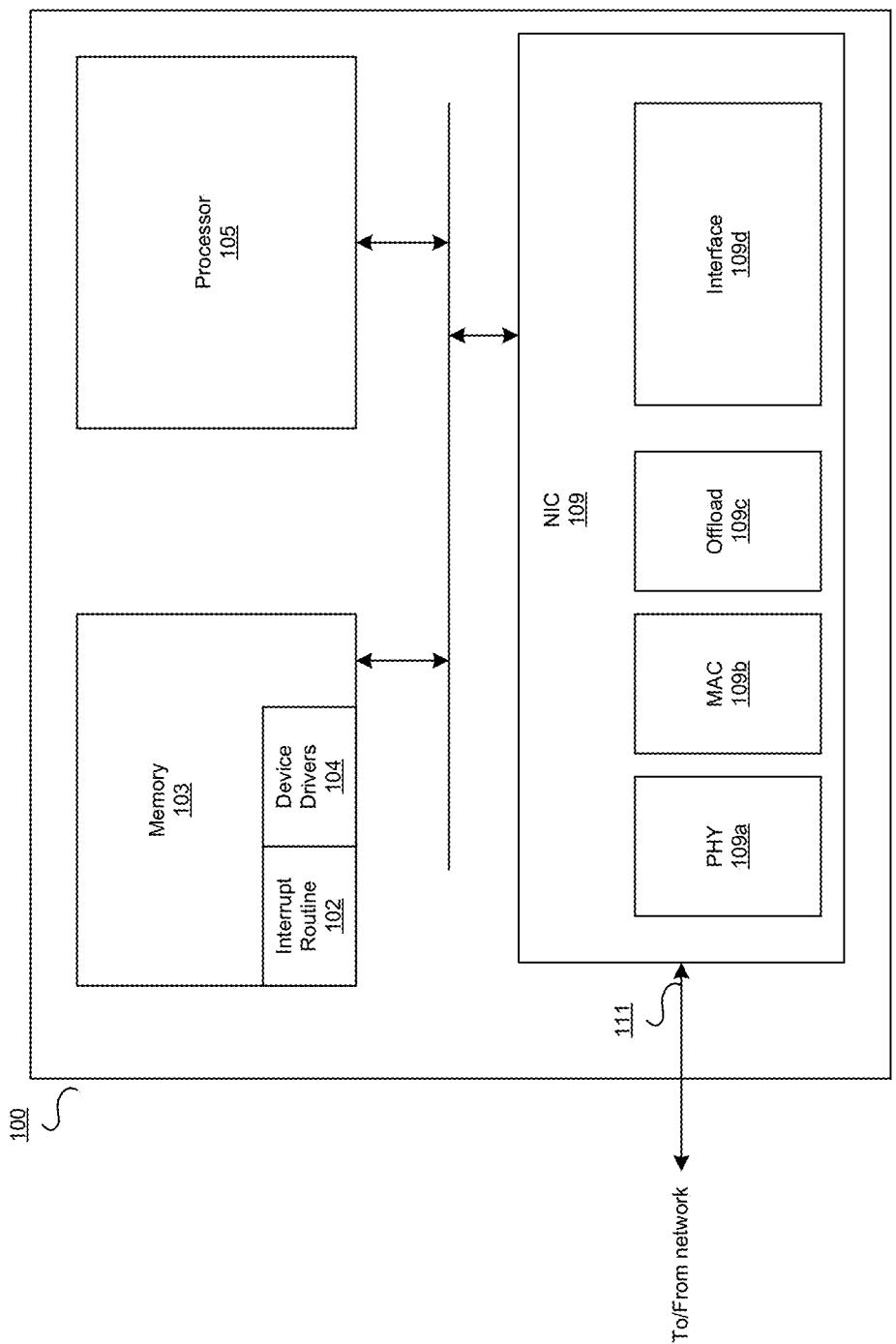
FIG. 1 is a block diagram illustrating an exemplary system comprising a network adapter, which may be utilized in connection with an embodiment of the invention.

Certain embodiments of the invention may be found in a method and system for a plurality of physical layers for network connection. Aspects of the invention may comprise utilizing at least one media access controller (MAC) to service a plurality of physical layer (PHY) devices. In this regard, the MAC may be communicatively coupled to one of the plurality of PHY devices based on signal presence. Signal presence may comprise, for example, auto-detecting network activity and/or lack of network activity at one or more of the plurality of physical layer devices, presence of a network device that may communicate with said at least one of the physical layer devices, and peer device presence. In instances where no network activity and network device is detected, one of the PHY devices may be utilized as a default PHY device for communication. On power up, the MAC may be coupled to a default PHY device. A PHY device may comprise a plurality of channels, which may independently detect network activity and/or network devices. Accordingly, channels that detect a common network device may be aggregated together to form a communication link to that network device. The aggregation may occur across PHY devices.

Accordingly, network data from one of the plurality of PHY devices may be processed by the MAC based on the auto-detection of network activity and/or network device via the plurality of PHY devices. Each of the plurality of PHY devices may be communicatively coupled to separate network devices, which may be, for example, network switches. The network devices may be located, for example, on a same network or on separate networks. For example, a first PHY device may be communicatively coupled to a first network device via a first network connection and a second PHY device may be communicatively coupled to a second network device via a second network connection. The network connections may be implemented via, for example, cables or traces on a backplane, SerDes links or any other means of connectivity.

Each network switch may operate at a different data rate. For example, the first network switch may be a 10 Gigabit Ethernet (10 GbE) switch and the second network switch may be a 1 GbE switch. The first PHY device and the second PHY device may have different physical medium interfaces. Accordingly, there may be instances when a network connection to the first PHY device may not be able to be used as a network connection to the second PHY device, and vice versa.

A plurality of channels may be aggregated as a communication link to a peer device, based on auto-detection of signal presence at each of the channels aggregated, and the communication link may be supported as a logical link by a media access controller. A channel may be, for example, a SerDes link. The signal presence may comprise network activity or lack of network activity at a physical layer device, presence of a network device that may communicate with physical layer devices, and/or peer device presence.

FIG. 1 is a block diagram illustrating an exemplary system comprising a network adapter, which may be utilized in connection with an embodiment of the invention. Referring to FIG. 1, there is shown, for example, a computer with network connection 100 with a few of the internal components, for example, a memory block 103, a processor 105, and a network interface card/circuitry (NIC) 109. The computer with network connection 100 may be, for example, a personal computer or a network server system serving one or more clients by providing access to the network. The NIC 109 may comprise a physical network interface layer (PHY) 109a, a media access controller (MAC) 109b, an offload engine 109c, and an interface block 109d. There may be interrupt routines, for example, interrupt routines 102, stored within the memory block 103. The interrupt routines 102 may be code and/or data that may allow the processor 105 to execute instructions in response to a hardware or software interrupt signals. Various hardware devices may also need device drivers, such as, for example, the device drivers 104, and the device drivers 104 may be stored in the memory block 103. The device drivers 104 may be code and/or data that may allow communication with hardware, such as, for example, the NIC 109. The processor 105 may communicate with the memory block 103 and the interface block 109d, and the interface block 109d may provide, for example, a host interface to the NIC 109. The NIC 109 may be connected to a network via, for example, a wire, a backplane trace, cable, or optical fiber. In this manner, the NIC 109 may transmit data to the network and receive data from the network.

The memory block 103 may comprise suitable logic, circuitry, and/or code that may be adapted to store a plurality of control, status and/or data information. Other processing blocks, such as, for example, the processor 105, may access the information stored in memory block 103. For example, the interface block 109d may comprise management and control registers that may be used to control the operation of the NIC 109. The processor 105 may comprise suitable logic, circuitry, and/or code that may be adapted to process data that may be read from, for example, the memory block 103. The processor 105 may store data in the memory block 103, and/or communicate data, status, and/or commands with other devices, such as, for example, the NIC 109.

The interface block 109d may comprise suitable logic, circuitry, and/or code that may be adapted to manage input/output of data from the processor 105 to, for example, the NIC 109. This may allow, for example, the faster devices such as the memory 103 and the processor 105 to be separated from slower peripheral devices, such as, for example, the NIC 109. Accordingly, the faster devices may not be bottlenecked while waiting for slower devices to transfer data. This may occur, for example, when a host processor, such as, for example, the processor 105, may communicate with the NIC 109 with regard to data to be transmitted on to a network, or data received from a network.

The PHY 109a may comprise suitable logic, circuitry, and/or code that may be adapted to interface to a network. The PHY 109a may establish a link to other network nodes using, for example, auto-negotiation and/or parallel detection. The MAC 109b may comprise suitable logic, circuitry, and/or code that may be adapted to properly format data for packet transmission on, for example, the Ethernet network. The MAC 109b may also be adapted to receive data from the Ethernet network and to remove the Ethernet network related frame information so that higher-level protocols may extract desired information from the received frame. The offload engine 109c may comprise suitable logic, circuitry, and/or code that may be adapted to process protocol layers above the OSI layer 2, such as, for example, TCP and/or IP.

In operation, the NIC 109 may communicate data with the network via a transceiver interface 111. The NIC 109 may receive, for example, Ethernet network data via the transceiver interface 111 and transmit Ethernet data to, for example, the Ethernet network via the transmit interface 111. When transmitting data to the network, the processor 105 may, for example, communicate data stored in the memory block 103 to the NIC 109 via the interface block 109d. The NIC 109 may process the data from the processor 105, and form appropriate frames for transmission to, for example, the Ethernet network. For example, the NIC 109 may generate Ethernet protocol information that may comprise, for example, a preamble, source and destination addresses, and/or error detection information.

The NIC 109 may also receive data from the Ethernet network via the NIC 109. The NIC 109 may remove network related information, for example, the Ethernet protocol information, and may communicate the remaining data to, for example, the processor 105 via, for example, the interface block 109*d*. The processor 105 may process the received frame to retrieve data that may have been sent by another application on the network. The processor 105 may save the processed data in the memory block 103.

Various embodiments of the invention may comprise differently arranged functional blocks. For example, one embodiment of the invention may design the NIC 109 as a stand-alone device. Another embodiment of the invention may integrate the NIC 109 into a chipset or the processor 105. Another embodiment of the invention may integrate a MAC into a chipset or the processor 105, and the MAC may communicate with an external PHY.

Figure 2:
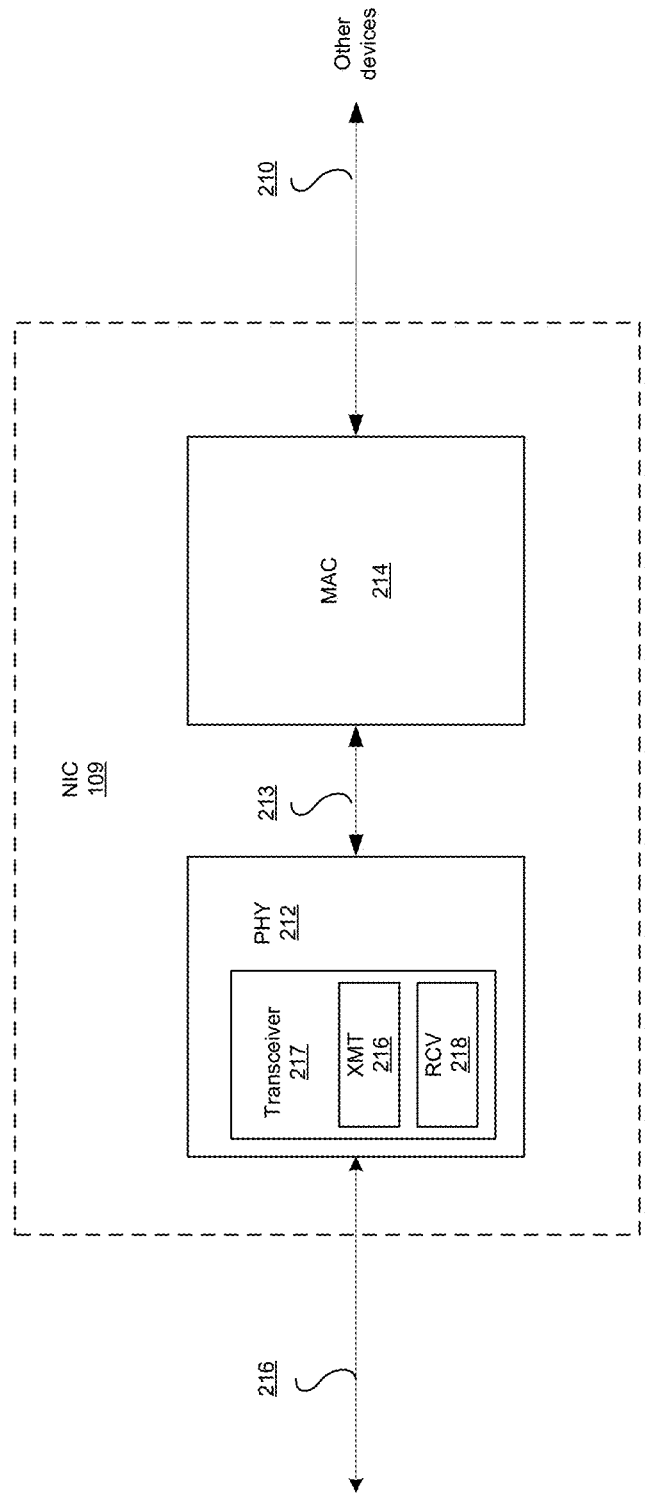
FIG. 2 is a block diagram illustrating an exemplary physical layer device and media access controller, which may be utilized in connection with an embodiment of the invention.

FIG. 2 is a block diagram illustrating an exemplary physical layer device and media access controller, which may be utilized in connection with an embodiment of the invention. Referring to FIG. 2, there is shown the NIC 109 that may comprise a physical network interface layer (PHY) 212 and a media access controller (MAC) 214. The PHY 212 may comprise suitable logic, circuitry, and/or code that may be adapted to interface to a network. The PHY 212 may comprise a transceiver 217, which may comprise a transmit interface 216 and a receive interface 218. The MAC 214 may comprise suitable logic, circuitry, and/or code that may be adapted to properly format data for packet transmission on, for example, the Ethernet network. The MAC 214 may also be adapted to receive data from the Ethernet network and to remove the Ethernet network related frame information so that higher-level protocols may extract desired information from the received frame.

In operation, the PHY 212 may communicate data to the Ethernet network via the transceiver 217. The PHY 212 may receive Ethernet network data via the receive interface 218, and transmit data to the Ethernet network via the transmit interface 216. The MAC 214 may receive data from, for example, the processor 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the network via the PHY 212. The MAC 214 may remove the network related information, for example, the Ethernet protocol information, and may communicate the remaining data to, for example, the processor 105. The remaining data may be communicated via, for example, a PCI Express bus 210. The processor 105 may process the received frame to retrieve data that may have been sent by another application on the network.

Figure 3:
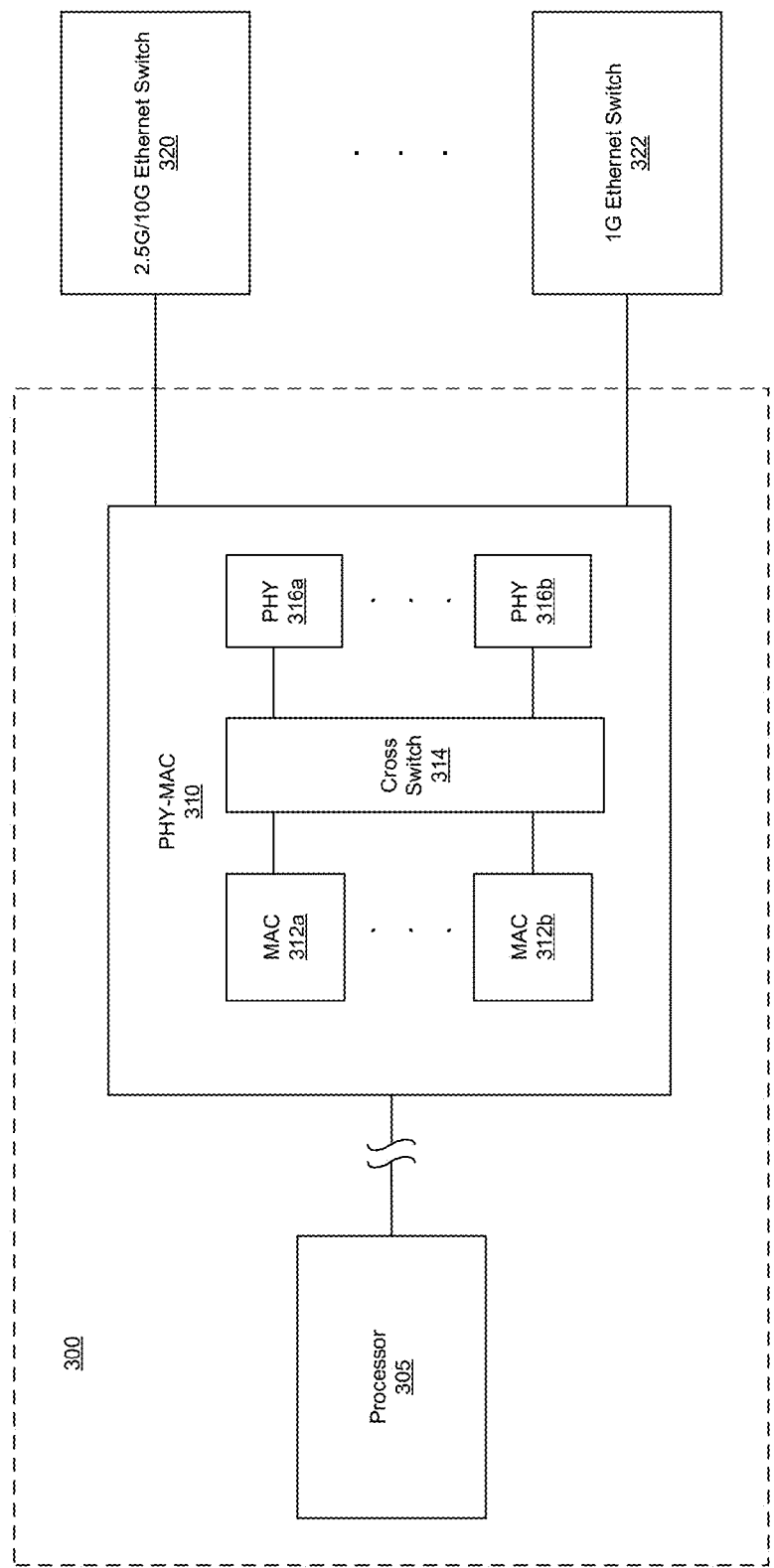
FIG. 3 is a block diagram illustrating exemplary computer system with PHY-MAC devices that may each communicate with a network switch, in accordance with an embodiment of the invention.

FIG. 3 is a block diagram illustrating exemplary computer system with PHY-MAC devices that may each communicate with a network switch, in accordance with an embodiment of the invention. Referring to FIG. 3, there is shown a computer's network system 300, which comprises a processor 305 and PHY-MAC device 310, which may be, for example, parts of the computer with network connection 100. The computer's network system 300 may also comprise other functional blocks for network communications as described with respect to FIG. 1. The processor 305 may be similar in functionality to the processor 105. The PHY-MAC device 310 may comprise a plurality of MACs 312*a* . . . 312*b*, a cross-switch 314, and a plurality of PHYs 316*a* . . . 316*b*. One of the pluralities of MACs 312*a* . . . 312*b* may be able to be connected to a subset of the PHYs 316*a* . . . 316*b*. The PHY-MAC device 310 may be connected to at least one Ethernet switch, for example, the Ethernet switches 320 . . . 322.

The PHY-MAC device 310 may be connected to, for example, the Ethernet switches 320 and 322 via the PHYs 316*a* and 316*b*. The Ethernet switch 320 may be, for example, rated to handle data at 2.5-10 Gbits/second and the Ethernet switch 322 may be, for example, rated to handle data at 1 Gbits/second or less. The Ethernet switches 320 and 322 may also, for example, use cables whose physical form factors may be different. Accordingly, a cable for the Ethernet switch 322 may not be able to be used for the Ethernet switch 320.

In operation, the PHY-MAC device 310 may have network cables plugged in, which may be, for example, connected to the Ethernet switches 320 and 322. It may be noted that with some configurations, such as, for example, a server blade configuration, the switches 320 and/or 322 may or may not be present. The computer's network system 300 may be configured to use, for example, the PHY 316*b* and the corresponding MAC 312*b* as a default for network access. However, if network activity is auto-detected from the Ethernet switch 320 via the PHY 316*a*, then the cross-switch 314 may be configured to use the corresponding MAC 312*a* to access the network. It may be desirable to use the PHY 316*a* to access the network since the PHY 316*a* may be connected to the Ethernet switch 320, which may be rated to handle data at 10 Gbits/second.

The processor 305 may use auto-detection of network activity from the Ethernet switch 320 to activate a switch from the PHY 316*b* to the PHY 316*a*. This may optimize throughput of data in and out of the server 300 via the faster Ethernet switch 320. While an embodiment of the invention may use a processor, such as, for example, the processor 305, the invention need not be so limited. Other designs may be used to switch based on auto-detection of network activity, such as, for example, a state machine, a protocol offload block, or a host interface.

While a one-to-one correspondence may have been described with respect to FIG. 3 for ease of description of the MACs and the PHYs, the invention need not be so limited. For example, the plurality of MACs 312*a* . . . 312*b* may each be able to support a range of data rates. Accordingly, a MAC may be able to support at least one of a plurality of PHYs, where each PHY may support at least one data rate. Accordingly, the cross switch 314 may be able to connect a MAC to one of a plurality of PHYs. Another embodiment of the invention may not utilize the cross switch 314. Rather, the PHY-MAC 310 may comprise a plurality of MACs 312*a* . . . 312*b* and a plurality of PHYs 316*a* . . . 316*b*, where a MAC may be directly connected to a PHY.

The FIGS. 4*a*, 4*b*, 4*c*, 4*e*, 5*a*, and 5*b* may illustrate instances where a single MAC may be used with a plurality of PHYs for ease of description. However, the invention need not be limited in this manner. Various embodiments of the invention may comprise a plurality of MACs used with a plurality of PHYs, where each MAC may be used with at least one PHY.

Figure 4A:
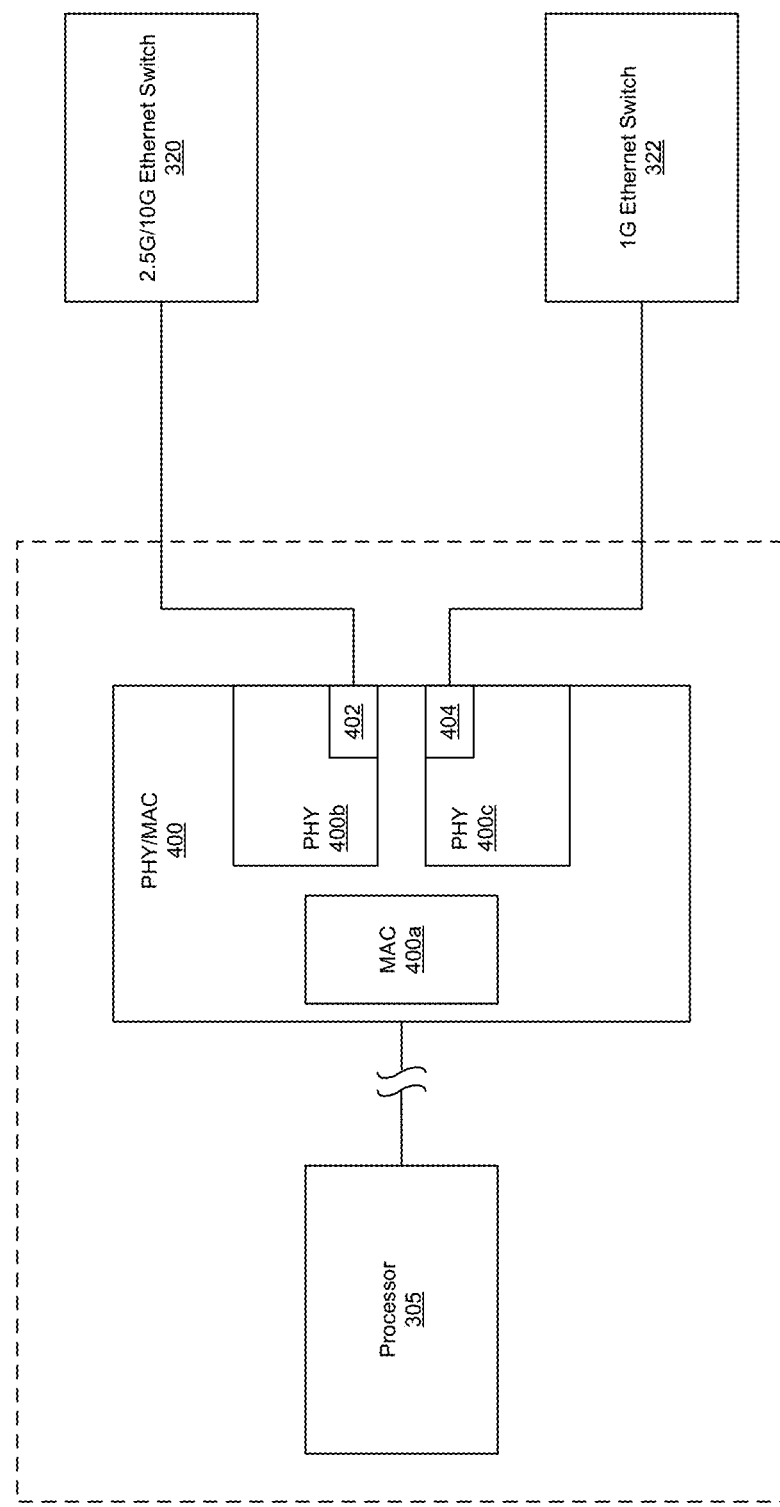
FIG. 4a is a block diagram illustrating an exemplary PHY-MAC device that may communicate with a plurality of switches, in accordance with an embodiment of the invention.

FIG. 4*a* is a block diagram illustrating an exemplary PHY-MAC device that may communicate with a plurality of switches, in accordance with an embodiment of the invention. Referring to FIG. 4*a*, there is shown the processor 305 and a PHY-MAC device 400. The PHY-MAC device 400 may comprise the MAC 400*a*, and the PHY devices 400*b* and 400*c*. The PHY-MAC device 400 may be connected to the Ethernet switches 320 and 322 via ports 402 and 404, respectively, in the PHY devices 400*b* and 400*c*, respectively. The port 402 may have a different form factor than the port 404 in order to be able to accommodate different types of cables that may be used to connect to the Ethernet switches 320 and 322.

While the PHY-MAC device 400 may function similarly to the PHY-MAC device 310, the PHY-MAC device 400 may have one MAC, for example, the MAC 400*a*, which handles data to and from both PHY devices 400*b* and 400*c*. The PHY-MAC device 400 may also auto-detect network activity associated with the Ethernet switches 320 and 322, and may switch from using one PHY to another PHY. This may be described in more detail with respect to FIGS. 4*b*, 4*c*, 5*a*, and 5*b*.

Figure 4B:
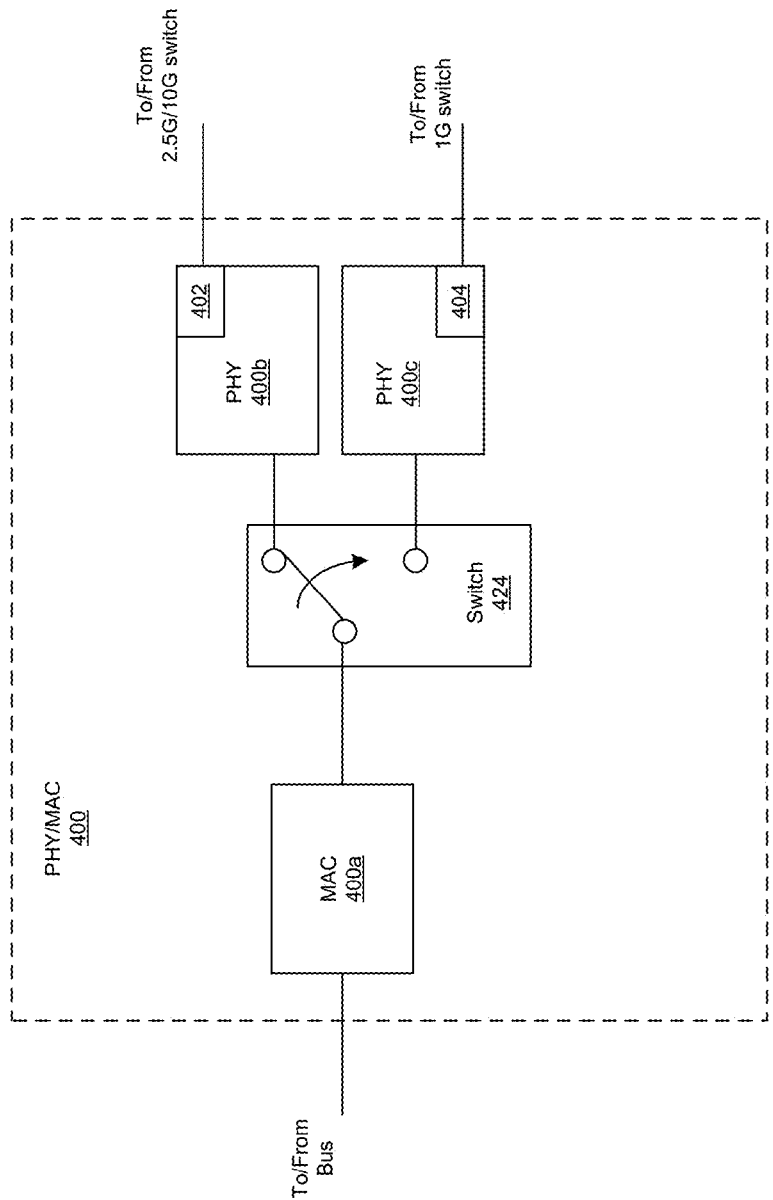
FIG. 4b is a block diagram illustrating an exemplary PHY-MAC device comprising a single MAC and multiple PHY, in accordance with an embodiment of the invention.

FIG. 4*b* is a block diagram illustrating exemplary PHY-MAC device comprising a single MAC and multiple PHY, in accordance with an embodiment of the invention. Referring to FIG. 4*b*, there is shown the PHY-MAC device 400, which may be, for example, part of the computer with network connection 100. The PHY-MAC device 400 may comprise the MAC 400*a*, a data switch 424, and PHY devices 400*b* and 400*c*. The data switch 424 may comprise suitable logic and/or circuitry that may enable transfer of data between the MAC 400*a* and either the PHY device 400*b* or the PHY device 400*c*. Accordingly, the data switch 424 may be configured to enable data transfer via the PHY device 400*b* or the PHY device 400*c*.

Whether the PHY device 400*b* or the PHY device 400*c* is used to communicate data with a network may depend on, for example, a data rate of a switch connected to the PHY device 400*b* and the PHY device 400*c*. For example, the PHY device 400*b* may be connected via the port 402 to an Ethernet switch that is rated to handle data rates of 10 Gbits/second, and the PHY device 400*c* may be connected via the port 404 to an Ethernet switch that is rated to handle data rates of 1 Gbits/second. Accordingly, if network activity is auto-detected via the PHY device 400*b*, then the PHY-MAC device 400 may be configured such that the data switch 424 may transfer data between the MAC 400*a* and the PHY device 400*b*.

If no network activity is auto-detected via the PHY device 400*b*, but there is network activity auto-detected via the PHY device 400*c*, then the PHY-MAC device 400 may be configured such that the data switch 424 may transfer data between the MAC 400*a* and the PHY device 400*c*. The default state of the PHY-MAC device 400 may be, for example, to transfer data between the MAC 400*a* and the PHY device 400*b*. Alternatively, the default state of the PHY-MAC device 400 may be, for example, to transfer data between the MAC 400*a* and the PHY device 400*c*. Auto-detection of network activity and configuration may be discussed in more detail with respect to FIGS. 4*c* and 4*d*.

Figure 4C:
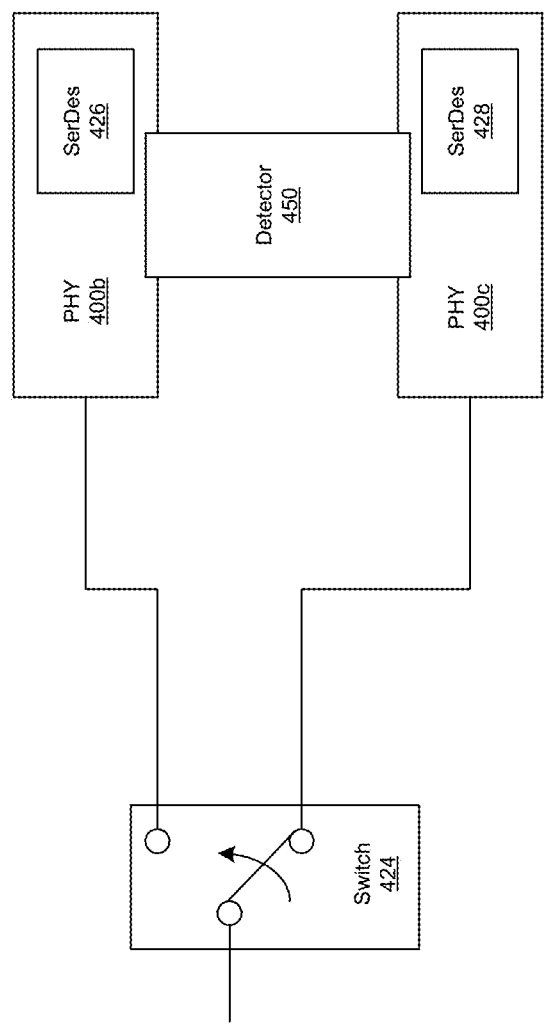
FIG. 4c is a block diagram illustrating exemplary auto-detection of network activity and switching between multiple PHY or sub-PHY devices, in accordance with an embodiment of the invention.

FIG. 4*c* is a block diagram illustrating exemplary auto-detection of network activity and switching between multiple PHY or sub-PHY devices, in accordance with an embodiment of the invention. Referring to FIG. 4*c*, there is shown the data switch 424, the PHY device 400*b*, the PHY device 400*c*, and the auto-detector block 450. The PHY devices 400*b* and 400*c* may each comprise a serializer-deserializer (SerDes) 426 and 428, respectively. The SerDes 426 and 428 may comprise suitable logic, circuitry, and/or code that may be adapted to receive parallel data and serialize it for transmission over a serial line, for example, a network, or receive serial data, for example, from a network, and convert it to parallel data. The parallel data may be transferred to and from, for example, the MAC 400*a* via the data switch 424.

The data received by the PHY device 400*b* and/or the PHY device 400*c* may be serial data, such as, for example, the serial data from the network received by the SerDes 426 and 428, respectively. The SerDes 426 and/or the SerDes 428 may convert the serial data to parallel data, and the SerDes 426 and/or the SerDes 428 may output parallel data to the data switch 424. The data switch 424 may communicate the parallel data to the MAC 400*a* via the data switch 424. The PHY device 400*b* and/or the PHY device 400*c* may also receive parallel data from, for example, the MAC 400*a* via the data switch 424. The SerDes 428 and/or the SerDes 428 may convert the parallel data to serial data for transmission to the network. Accordingly, the SerDes 426 and 428 may allow the PHY/MAC device 400 to process multiple lanes of data.

The auto-detector block 450 may comprise suitable logic and/or circuitry that may enable auto-detection of network activity via the PHY device 400*b* and/or the PHY device 400*c*. The auto-detector block 450 may also comprise suitable logic and/or circuitry that may enable configuring of the data switch 424 for data transfer via the PHY device 400*b* or the PHY device 400*c*. In one embodiment of the invention, the auto-detector block 450 may detect network activity if the energy received via the PHY device 400*b* is above a pre-determined threshold level. Similarly, the auto-detector block 450 may determine that there is network activity if the energy received via the PHY device 400*c* is above the pre-determined threshold level. Another embodiment of the invention may auto-detect network activity, for example, by parsing data received by the PHY device 400*b* and the PHY device 400*c*.

For example, the PHY device 400*b* and the PHY device 400*c* may comprise circuitry that may encode serial data to be transmitted to the network and/or decode serial data received from the network. The encoding/decoding functionality may be part of, for example, the auto-detector block 450, the SerDes 426 and 428, or other circuit blocks in the PHY device 400*b* and the PHY device 400*c*. The encoding/decoding may comprise, for example, an 8B10B coding scheme or a 64B66B coding scheme.

For example, the PHYs 426 and 428 may decode, or look for valid code words in the received data from the network in order to detect network activity. If the received data comprises valid code words that can be successfully decoded by, for example, using the 8B10B or 64B66B coding scheme, then network activity may be deemed to be detected. Accordingly, the PHY 426 and/or the PHY 428 that successfully decoded the received data may provide an indication of detected network activity to the auto-detector block 450. The auto-detector block 450 may then appropriately configure the data switch 424.

The auto-detector block 450 may indicate the presence of network activity if the PHY device 400*b* is connected to, for example, the Ethernet switch 320, and the Ethernet switch 320 is switching data packets. The auto-detector block 450 may not detect the presence of network activity if, for example, the PHY device 400*b* is not connected to any Ethernet switch. Alternatively, the auto-detector block 450 may not detect the presence of network activity even if the PHY device 400*b* is connected to, for example, the Ethernet switch 320 if the Ethernet switch 320 is not active and/or is not processing data packets. The auto-detector block 450 may similarly determine whether there is network activity via the PHY device 400c, which may be connected to, for example, the Ethernet switch 322.

Upon auto-detection of network activity via the PHY device 400b and/or the PHY device 400c, the auto-detector block 450 may, for example, configure the data switch 424 such that it may transfer data between the MAC 400a and the PHY device 400b or the PHY device 400c. For example, the default connection upon power-up of the NIC 109 may be between the MAC 400a and the PHY device 400b. Alternatively, the default connection upon power-up of the NIC 109 may be between the MAC 400a and the PHY device 400b. Additionally, in one embodiment of the invention, the data switch 424 may be configured such that the connection may be between the MAC 400a and the PHY device 400c if network activity is detected only via the PHY device 400c. For this embodiment of the invention, for example, if network activity is not detected only via the PHY device 400c, the data switch 424 may be configured such that the connection may be between the MAC 400a to the PHY device 400b.

Other embodiments of the invention may generate an interrupt to, for example, the processor 105. The processor 105 may then execute an interrupt routine that may be a part of the interrupt routines 102, stored on the memory block 103. The processor 105 may execute the interrupt routine to configure the data switch 450.

Accordingly, energy level detection or parsing/decoding of received signals may be used to determine whether a PHY detects network activity. However, the invention need not be so limited. For example, other embodiments of the invention may detect valid bits before determining that network activity has been detected.

FIG. 4d is an exemplary graph of network energy detected versus time, in accordance with an embodiment of the invention. Referring to FIG. 4d, there is shown an energy threshold level 480 and network link energy level 485 from, for example, the port 402 on the PHY device 400b. The network link energy level 485 may vary over time. At a time instant T0, the network link energy level 485 may be below the energy threshold level 480. At a time instant T1, the network link energy level 485 may be above the energy threshold level 480. Accordingly, the auto-detector block 450 may auto-detect the change in the network link energy level 485 from below the energy threshold level 480 to above the energy threshold level 480. The auto-detector block 450 may, for example, wait for a period of time from the time instant T1 to a time instant T2. The wait may be to reduce false detection of spurious energy levels above the threshold due to noise. The auto-detector block 450 may determine at the time instant T2 that the network link energy level 485 may be below the energy threshold level 480.

At a time instant T3, the network link energy level 485 may be above the energy threshold level 480. Accordingly, the auto-detector block 450 may auto-detect the change in the network link energy level 485 from below the energy threshold level 480 to above the energy threshold level 480. The auto-detector block 450 may wait for period of time to alleviate effects from spurious noise. Since the energy level 485 may be above the energy threshold level 480 for a period of time from the time instant T3 to a time instant T4, the auto-detector block 450 may determine at the time instant T4 that there is network activity.

Figure 4E:
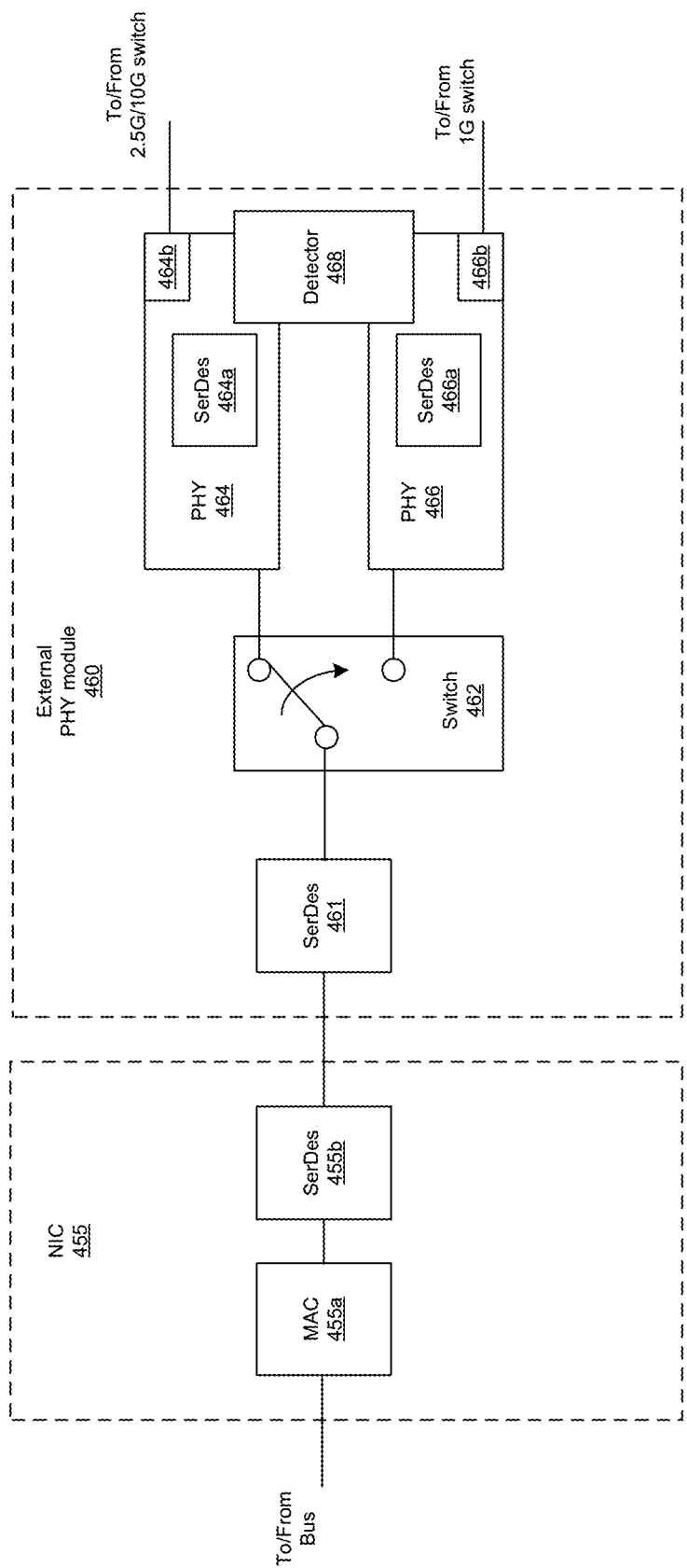
FIG. 4e is a block diagram illustrating an exemplary PHY-MAC device comprising a single MAC coupled to external PHY module comprising a plurality of PHY devices, in accordance with an embodiment of the invention.

FIG. 4e is a block diagram illustrating an exemplary PHY-MAC device comprising a single MAC coupled to external PHY module comprising a plurality of PHY devices, in accordance with an embodiment of the invention. Referring to FIG. 4e, there is shown a portion of a NIC 455, which may be, for example, part of the computer with network connection 100, and an external PHY module 460. The NIC 455 may comprise a MAC 455a and a SerDes 455b. The external PHY module 460 may comprise a SerDes 461, the data switch 462, the PHY devices 464 and 466, and the auto-detector block 468. The PHY device 464 may comprise a SerDes 464a and a port 464b. The PHY 466 may comprise a SerDes 466a and a port 466b. The external PHY module 460 may be external to a chip that the NIC 455 may be a part of, or the external PHY module 460 may be circuitry that may be logically isolated from the MAC 400a. Accordingly, data may be communicated between the NIC 455 and the external PHY module 460 via, for example, a serial path rather than a parallel path.

For example, in communicating data from the NIC 455 to the external PHY module 460, the SerDes 455b may convert parallel data from the MAC 455a to serial data. The serial data may then be communicated to the external PHY module 460. The SerDes 461 may convert the serial data to parallel data, and may communicate the serial data to the switch 462. The switch 462 may allow the parallel data to be sent to either the PHY device 464 or the PHY device 466. The SerDes in the PHY device 464 or the PHY device 466 may receive the parallel data, and convert the received parallel data to serial data to be transmitted via the port 464b or 466b.

Similarly, data may be received from the network via the port 464b and/or 466b. The data may be communicated to the NIC 455 from the SerDes 464a or the SerDes 466a, via the data switch 462 and the SerDes 461. The SerDes 455b at the NIC 455 may receive the serial data from the external PHY module 460, and may convert the serial data to parallel data. The parallel data may then be communicated to the MAC 455a.

Network detection may be implemented, for example, in the external PHY module 460. The auto-detector block 468 may be used to configure the data switch 462 in order to communicatively couple the NIC 455 with an appropriate PHY device 464 or 466. Network detection and switching may be, for example, as described with respect to FIG. 4c.

Figure 5A:
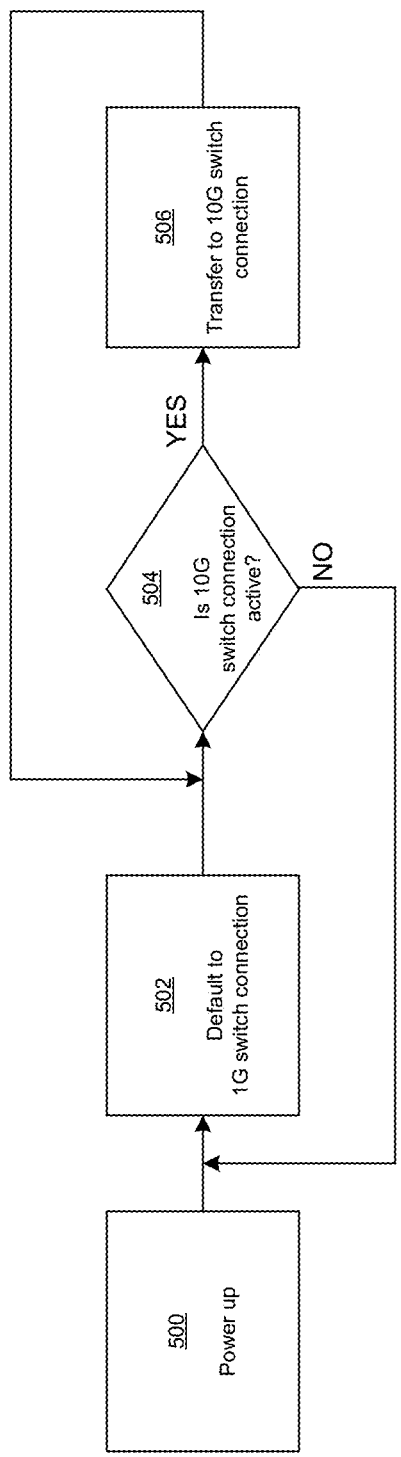
FIG. 5a is a flow diagram illustrating an exemplary routine for implementing a plurality of physical layers for network connection, in accordance with an embodiment of the invention.

FIG. 5a is a flow diagram illustrating an exemplary routine for implementing a plurality of physical layers for network connection, in accordance with an embodiment of the invention. Referring to FIG. 5a, there is shown exemplary steps 500 to 506 for configuring the data switch 424 to transfer data between the MAC 400a to the PHY device 400c as a default upon power-up. The data switch 424 may also be configured to transfer data between the MAC 400a to the PHY device 400c when network activity is auto-detected via the PHY device 400c but not via the PHY device 400b. In an exemplary case, the PHY device 400c may be connected to the 1 Gbit/second Ethernet switch 322 and the PHY device 400b may be connected to the 10 Gbit/second Ethernet switch 320.

In step 500, the NIC 109 may be powered up. In step 502, the data switch 424 may be configured to a default setting, which may be, for example, connecting the MAC 400a to the PHY device 400c. In step 504, the auto-detector block 450 may determine that there is network activity via signals received by the PHY device 400b from the 10 Gbit/second Ethernet switch 320. If so, the next step may be step 506. Otherwise, the next step may be step 502. In step 506, the auto-detector block 450 may configure the data switch 424 to connect the MAC 400a to the PHY device 400b.

Figure 5B:
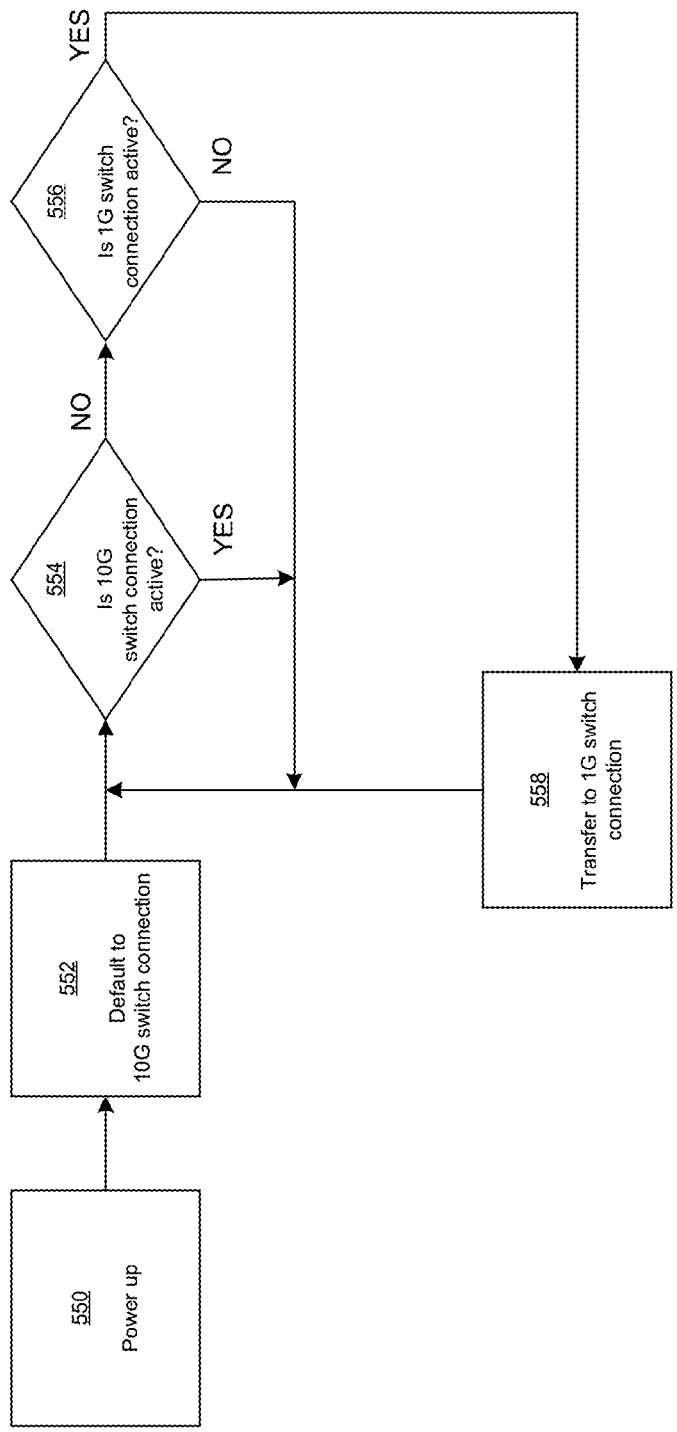
FIG. 5b is a flow diagram illustrating an exemplary routine for implementing a plurality of physical layers for network connection, in accordance with an embodiment of the invention.

FIG. 5b is a flow diagram illustrating an exemplary routine for implementing a plurality of physical layers, in accordance with an embodiment of the invention. Referring to FIG. 5b, there is shown exemplary steps 550 to 558 for configuring the data switch 424 to connect the MAC 400a to the PHY device 400b as a default upon power-up, and also when network activity is detected via the PHY device 400c but not via the PHY device 400b. For example, the PHY device 400c may be connected to the 1 Gbit/second Ethernet switch 322 and the PHY device 400b may be connected to the 10 Gbit/second Ethernet switch 320.

In step 550, the NIC 109 may be powered up. In step 552, the data switch 424 may be configured to a default setting, which may, for example, transfer data between the MAC 400a and the PHY device 400b. In step 554, the auto-detector block 450 may determine that there is network activity via signals received by the PHY device 400b from the 10 Gbit/second Ethernet switch 320. If so, the next step may be step 554 again. Otherwise, the next step may be step 556.

In step 556, the auto-detector block 450 may determine that there is presence of network activity via signals received by the PHY device 400c from the 1 Gbit/second Ethernet switch 322. If so, the next step may be step 558. Otherwise, the next step may be step 554. In step 558, the auto-detector block 450 may configure the data switch 424 to connect the MAC 400a to the PHY device 400c. The next step may be step 554.

Figure 6:
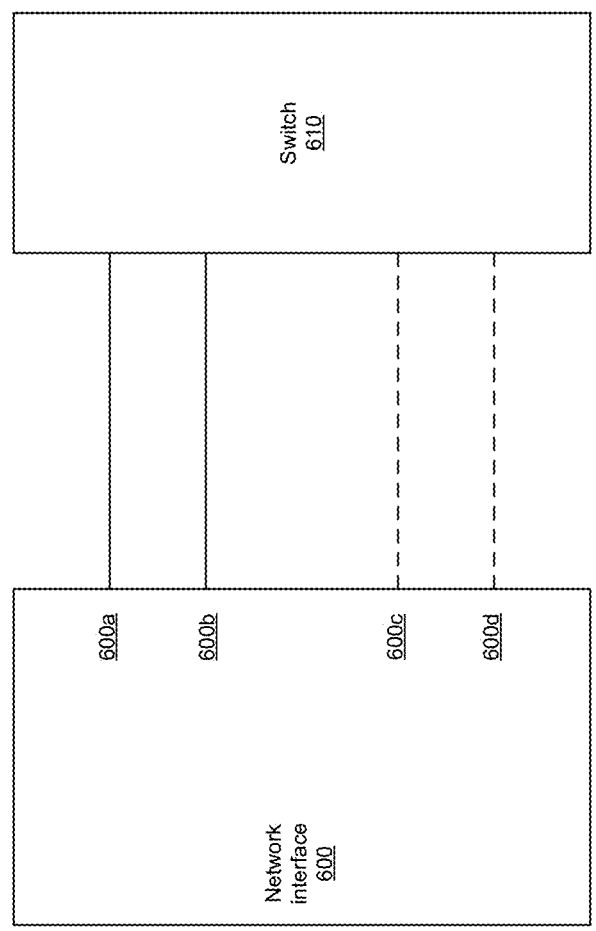
FIG. 6 is a block diagram illustrating an exemplary network interface, in accordance with an embodiment of the invention.

FIG. 6 is a block diagram illustrating an exemplary network interface, in accordance with an embodiment of the invention. Referring to FIG. 6, there is shown a network interface 600 and a switch 610. The network interface may be, for example, similar to a PHY/MAC. The network interface 600 may comprise a plurality of ports 600a . . . 600d for communicating with a network, for example, an Ethernet network. Each of the ports 600a . . . 600b may consist of the minimal complete communication path, such as, for example, a single SerDes lane. The SerDes lane may be, for example, implemented by four traces on a printed circuit board. A port may also be an implementation of a component of a complete PHY, such as, for example, XGMII, MII, or other lower level interfaces. With respect to FIG. 6, the communication with the network may be via the switch 610. The switches 610 may be similar to, for example, the Ethernet switches described with respect to FIGS. 3, 4a, 4b, 4e, 5a, and 5b.

The network interface 600 may communicate with the switch 610 via ports where a signal may have been detected. In case signal activity is detected on only the ports 600a and 600b, the ports 600a and 600b may be grouped to a communication link that may enable, for example, doubling of the speed of a link with respect to using only the port 600a or the port 600b. Accordingly, if signal activity is detected on all the ports available to a network interface, then all the ports may be grouped to a communication link. For example, if signal activity is detected on the ports 600a, 600b, 600c, and 600d of a network interface, those four ports may be grouped to a communication link to the switch 610. In some instances the number of ports may not match the PHY and/or MAC capabilities, and then only a subset of the ports may be aggregated and grouped to a link. Similarly, if the number of links is limited by the PHY and/or MAC capabilities, then the number of links may be limited. Each port may also be referred to as a channel. The network connections to a port may be implemented via, for example, cables or traces on a backplane, SerDes links or any other means of connectivity.

In an embodiment of the invention, a PHY and/or a MAC, for example, the PHY 109a and the MAC 109b, may initiate detection of energy by sending energy or pre-determined code word on available links to stimulate a response. A separate protocol may be used to enumerate the links available to the network interface 600 and may assign information to the links. The scheme for assignment and protocol may be design and/or implementation dependent. During transmission, the scheme may comprise, for example, of converting an information unit from the MAC to one or more information units in the PHY and transmitting from the PHY to the links. On reception, the process may be reversed.

Figure 7:
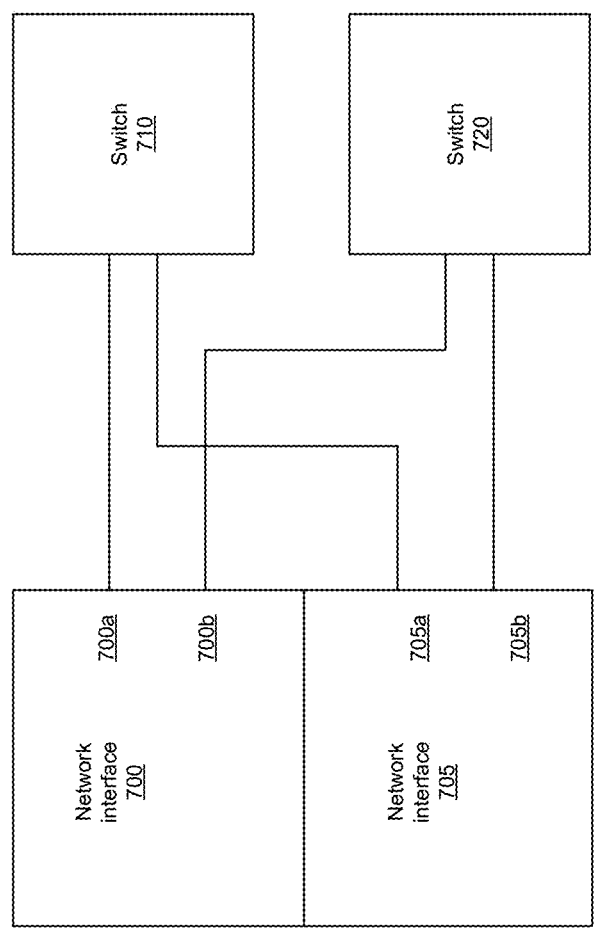
FIG. 7 is a block diagram illustrating exemplary network interfaces, in accordance with an embodiment of the invention.

FIG. 7 is a block diagram illustrating exemplary network interfaces, in accordance with an embodiment of the invention. Referring to FIG. 76, there is shown network interfaces 700 and 705, and switches 710 and 720. The network interfaces 700 and 705 may be, for example, similar to the network interface 600. The network interfaces 700 and 705 may each comprise a plurality of ports 700a . . . 700b and 705a . . . 705b, respectively, for communicating with a network, for example, an Ethernet network. With respect to FIG. 7, the communication with the network may be via switches 710 and 720. The switches 710 and 720 may be similar, for example, to the switches 610 and 620.

The network interface 700 may communicate with the switch 710 via the port 700a and with the switch 720 via the port 700b. The network interface 705 may communicate with the switch 710 via the port 705a and with the switch 720 via the port 705b. Accordingly, if the network activity is auto-detected on ports 700a and 705a, communication lanes using the port 700a in the network interface 700 and the port 705a in the network interface 705 to the switch 710 may be used for data transfer between the network interfaces 700 and 705 and the switch 710. An embodiment of the invention may, for example, create a link that aggregates lanes connecting the network interface 700 and the switch 710. Accordingly, an embodiment of the invention may aggregate all lanes connecting network interface 705 and switch 710 to create as wide a link as possible. Similarly, auto-detection of network activity on ports 700b may aggregate all lanes using the ports 700b to transfer data between the switch 720 and the network interfaces 700. Similarly for lanes connecting port 705b to switch 720. The aggregated communication lanes from the plurality of network interfaces 700 . . . 705 may be connected to a PHY or a MAC, where the PHY or MAC may support the network interfaces 700 . . . 705.

Figure 8:
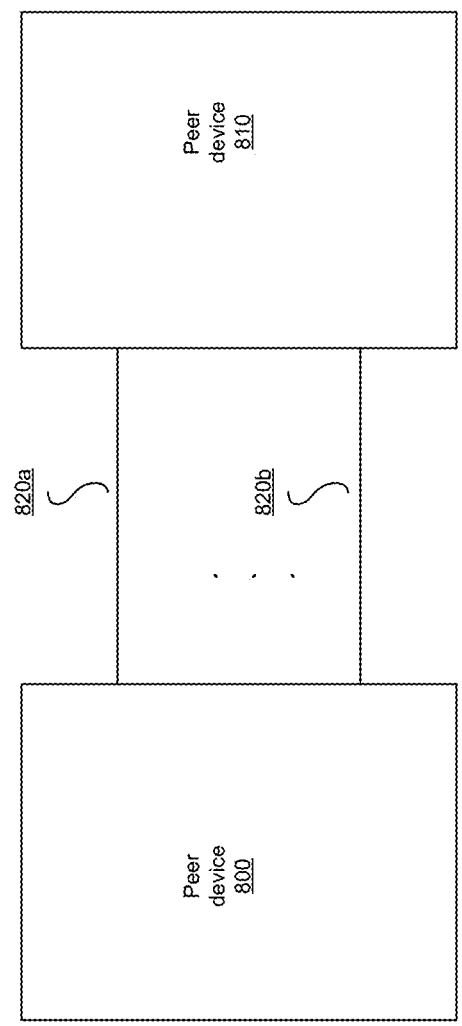
FIG. 8 is a block diagram illustrating exemplary peer devices, in accordance with an embodiment of the invention.

FIG. 8 is a block diagram illustrating exemplary peer devices, in accordance with an embodiment of the invention. Referring to FIG. 8, there is shown a peer device 800 and a peer device 810. The peer devices 800 and 810 may comprise logic, circuitry, and/or code that may enable communication via a communication link formed with one or more channels 820a . . . 820b. The peer devices 800 and 810 may each support, for example, a number of channels in the communication link between the two peer devices. Those channels driven by both ends will be successful in auto detection of signal or activity leading to establishing a link. Accordingly, a peer device may comprise a MAC that may control communication of data to another peer device via at least one channel and at least one PHY. There may be, therefore, a logical link between the peer devices 800 and 810 that may comprise at least one physical link 820a . . . 820b.

While a channel may have been described as a port at a physical layer device, the invention need not be so limited. For example, a channel may comprise a port, for example, implemented using SerDes, as well as higher level protocols that may be needed to communicate via that port. Accordingly, a channel may not be specifically associated with a PHY and/or a MAC, for example, until the channel is used to form a communication link between the two peer devices.

Although the auto-detector block 450 may have been described as comprising the functionalities to auto-detect network activity and to configure the data switch 424, the invention need not be so limited. For example, the functionality to configure the data switch 424 may be, for example, in another functional block such as the data switch 424. Additionally, although descriptions of various embodiments of the invention may have shown two PHY-MAC devices connected to two data switches for ease of explanation, the invention need not be so limited. Various embodiments of the invention may comprise a plurality of PHY-MAC devices connected to a plurality of data switches.

Also, while various embodiments of the invention may have been described as interfacing to the Ethernet network, the invention need not be so limited. Various embodiments of the invention may interface to other types of networks via, for example, optical fiber. Accordingly, various embodiments of the invention may use PHYs with appropriate interfaces, for example, SerDes interface or CSMA/CD interface, for interfacing to different types of networks. The type of PHY interface used may be design and/or implementation dependent.

In accordance with an embodiment of the invention, aspects of an exemplary system may comprise the data switch 424 that may enable switching among a plurality of PHYs, such as, for example, the PHY device 400b and the PHY device 400c. Accordingly, the MAC 400a may be communicatively coupled to either the PHY device 400b or the PHY device 400c, and the MAC 400a may possess a capability to process network data from the PHY device 400b or the PHY device 400c based on the auto-detection signal presence. Signal presence may comprise, for example, network activity or lack of network activity at a physical layer device, presence of a network device that may communicate a physical layer device, and peer device presence. The PHY device 400b and the PHY device 400c may be, for example, communicatively coupled to a similar, or same, network, although the invention is not limited in this regard.

The PHY device 400b may be communicatively coupled to, for example, a network switch 320 via a first network connection and the PHY device 400c may be communicatively coupled to, for example, a second network switch 322 via a second network connection. A data rate of the network switch 320 may be, for example, greater than a data rate of the network switch 322. The data switch 424 may be configured to enable the MAC 400a to operate with the PHY device 400b if there is auto-detection of network activity via the first physical layer device. Alternatively, the data switch 424 may enable the MAC 400a to operate with the PHY device 400c if network activity is auto-detected via the PHY device 400c, but not via the PHY device 400b. Various ports, or channels, in one or more PHY devices may also be aggregated if auto-detection occurs to a common network device. Accordingly, the aggregated ports may form a communication link to the auto-detected network device.

In one aspect of the invention, the PHY device 400b and the PHY device 400c may have different physical medium interfaces. Accordingly, a connection, for example, a cable, to the PHY device 400b may not be able to be used for the PHY device 400c. The data switch 424 may connect the MAC 400a to the PHY device 400b as a power-up default. Alternatively, the data switch 424 may connect the MAC 400a to the PHY device 400c as a power-up default.

Although some embodiments of the invention may comprise a single MAC that may support multiple network rates for a plurality of PHYs, the invention need not be so limited. For example, a plurality of MACs may be used, where each MAC may support a range of network rates or at least one rate. Accordingly, at least one MAC may be able to support a PHY that may have auto-detected network activity. In this case, a MAC capable of supporting the PHY with auto-detected network activity may be selected. The controller may comprise additional functionality that may be shared by at least one MAC and the plurality of PHYs. The functionality may be, for example, a shared host interface, or an offload engine for TCP, IP or other protocol above the OSI layer 2.

Additionally, auto-detection of network activity may have been described as occurring generally in the PHY, for example, the PHY 400b or 400c, or in a network interface, for example, the network interface 600. The auto-detection may occur at one or more of many sublayers within a PHY or a network interface. For example, the auto-detection may occur at a physical coding sublayer (PCS) interface, a 10 Gigabit attachment unit interface (XAUI), or for each SerDes lane.

Another embodiment of the invention may provide a machine-readable storage, having stored thereon, a computer program having at least one code section executable by a machine, thereby causing the machine to perform the steps as described above for a plurality of physical layers for network connection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A system, comprising:
a media access controller configured to:
communicate with a first physical layer device, the first physical layer device being communicatively coupled to a first network switch; and
communicate with a second physical layer device, the second physical layer device being communicatively coupled to a second network switch; and
circuitry configured to auto-detect a signal presence of the first physical layer device or a signal presence of the second physical layer device, the circuitry configured to auto-detect by decoding data received by at least one of the first physical layer device or the second physical layer device.

2. The system of claim 1, wherein the first physical layer device is designated as a default physical layer device.

3. The system of claim 2, wherein the media access controller is configured to communicate with the default physical layer device via a default connection in response to a power-up of the media access controller.

4. The system of claim 2, wherein the media access controller is configured to switch from communicating with the default physical layer device to the second physical layer device in response to auto-detecting the signal presence of the second physical layer device.

5. The system of claim 1, further comprising:
a data switch configured to communicatively couple the media access controller to the first physical layer device and to the second physical layer device, wherein
the data switch is configured to be responsive to the signal presence of the first physical layer device or the signal presence of the second physical layer device.

6. The system of claim 1, wherein
the first physical layer device is configured to be communicatively coupled to the first network switch via a first physical medium, and
the second physical layer device is configured to be communicatively coupled to the second network switch via a second physical medium.

7. A method, comprising:
communicatively coupling a media access controller to a first physical layer device via a data switch, wherein the first physical layer device is associated with a first data communication rate;
detecting a network activity via a signal received by a second physical layer device, wherein the second physical layer device is associated with a second data communication rate; and
communicatively coupling the media access controller to the second physical layer device via the data switch in response to detecting the network activity.

8. The method of claim 7, further comprising;
deactivating communication between the media access controller and the first physical layer device in response to detecting the network activity.

9. The method of claim 7, further comprising;
communicatively coupling the media access controller to the first physical layer device via the data switch upon a power-up of the media access controller to establish a default connection between the media access controller and the first physical layer device.

10. The method of claim 7, wherein detecting the network activity comprises detecting an energy level of the signal.

11. The method of claim 10, wherein detecting the network activity comprises determining whether the energy level of the signal exceeds a threshold amount for a predetermined period of time.

12. The method of claim 7, wherein at least one of the first physical layer device or the second physical layer device comprises a SerDes, the SerDes being operable to convert serial data to parallel data.

13. The method of claim 7, wherein a network interface card (NIC) comprises the media access controller, wherein the first physical layer device and the second physical layer device are external to the NIC.

14. A system, the system comprising:
a communication device comprising a media access controller, the communication device being configured to:
auto-detect a first signal presence of a first channel;
auto-detect a second signal presence of a second channel;
aggregate the first channel and the second channel as a single communication link in response to an auto-detection of the first signal presence and an auto-detection of the second signal presence; and
communicate with a remote communication device via the single communication link.

15. The system of claim 14, wherein the communication device is configured to communicate with the remote communication device via the single communication link by communicating via the first channel and via the second channel.

16. The system of claim 14, wherein the single communication link comprises a logical link that is controlled by the media access controller.

17. The system of claim 14, wherein the first channel is a SerDes link.

18. The system of claim 14, wherein the first channel comprises a first port of a first physical layer device, wherein the second channel comprises a second port of a second physical layer device.

19. The system of claim 14, wherein the first signal presence indicates at least one of a network activity or a presence of the remote communication device.

20. The system of claim 14, wherein the single communication link comprises a peer-to-peer link.

* * * * *